United States Patent Office 3,350,062
Patented Oct. 31, 1967

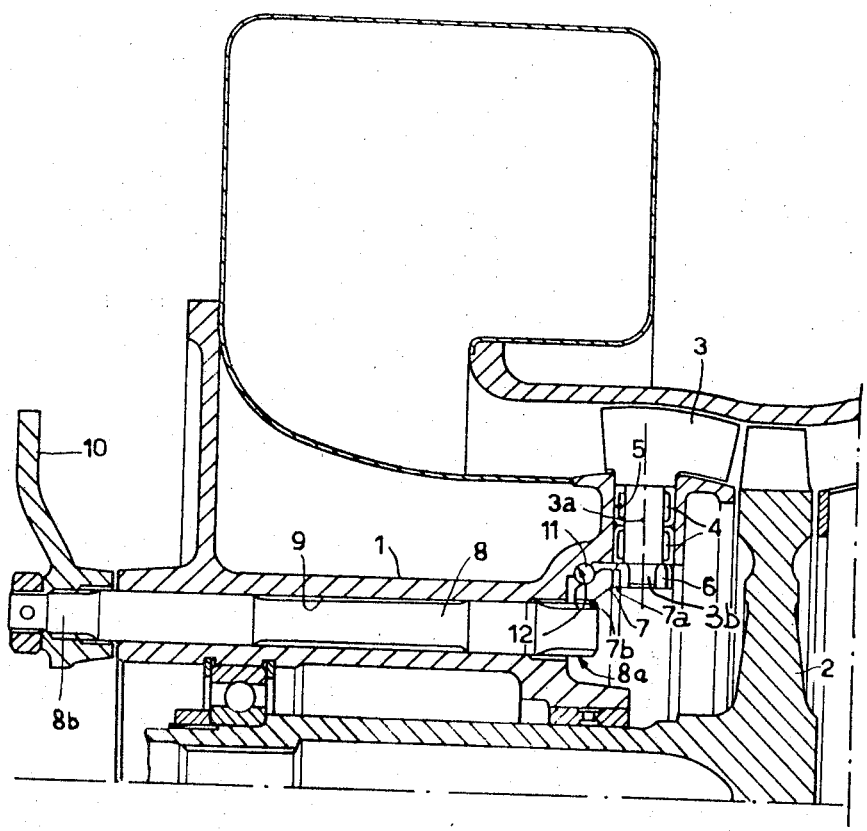

3,350,062
GAS TURBINE
Mario Calovolo, Turin, Italy, assignor to Fiat Societa per Azioni, Turin, Italy
Filed Oct. 11, 1966, Ser. No. 585,894
Claims priority, application Italy, Oct. 14, 1965, 23,337/65
1 Claim. (Cl. 253—78)

ABSTRACT OF THE DISCLOSURE

An adjustable distributor arrangement having a control shaft parallel with the impeller axis and operable to control the orientation of the distributor blades through a ring having inner and outer teeth sets engageable, respectively, with the control shaft and a toothed gear wheel matching teeth formed on the base of the rotatably mounted distributor blades. The ring is mounted in the stator by a ball and race and the distributor blades are rotatably mounted within the stator and supported therein by roller bearings.

The present invention relates to an arrangement for varying the inclination of the blades of the distributor of a gas turbine.

The main object of the invention is to provide such an arrangement which may be constructed without difficulty and which is not likely to jam on account of the considerable expansion which occur as a result of the high temperatures at which such turbines operate.

Another object of the invention is to provide a precision arrangement which will allow very small angular movements of the blades, thus enabling precise suiting of the distributor to different speeds of the impeller with a view to obtaining maximum turbine efficiency without working fluid loss.

A further object of the invention is to provide an arrangement which provides for absolute fluid-tightness of the distributor, so as to avoid loss of the working fluid from the high pressure section of the turbine to the external environment and consequent loss of power.

According to these and other objects, the invention consists in an arrangement for varying the inclination of the blades of the distributor of a gas turbine, the arrangement comprising a ring which is freely rotatable with respect to the turbine stator and which is arranged coaxially with the turbine impeller, the said ring carrying two sets of teeth, the first and outer set of which mesh with a plurality of toothed wheels which are keyed one each to the base of an orientable blade of the distributor and the second and inner set of which mesh with the toothed end of a control shaft rotatably mounted in an axial seat formed within the stator, the said control shaft being parallel with the axis of the impeller.

These and other objects and advantages of the invention will be clear from the following description, given with reference to the accompanying drawing which is by way of example and in which there is shown, in axial section, the distributor of a gas turbine provided with an arrangement according to the invention.

In the drawing there is shown a stator 1 of a gas turbine and a rotatable impeller 2 to which the fluid under pressure is fed via a distributor which is provided with a crown of orientable blades 3. The blades 3 have each a cylindrical base 3a which extends radially and which is supported rotatably, with the interposition of rollers 4, in a correspondingly dimensioned cylindrical seat 5 formed in the stator.

One end 3b of the base 3a is of reduced diameter, this end extending beyond the said seat 5 and having keyed thereto a toothed wheel 6.

The wheels 6 of the different blades each mesh with a first and outer set of teeth 7a of a ring 7 which is freely rotatable with respect to the stator 1 and is coaxial with the impeller 2. The ring 7 is provided with a second and inner set of teeth 7b disposed at right angles to the teeth 7a, the said second set of teeth engaging the toothed end 8a of a control shaft 8 which is rotatably mounted in an axial seat 9 formed longitudinally through the stator 1. The shaft 8 is parallel to the shaft of the impeller 2.

The other end 8b of the shaft 3 extends from the seat 9 and is keyed, for example by an arrangement of abutting grooves, to a bar 10 by means of which the shaft 3 may be turned about its axis in the said seat.

Advantageously the toothed ring 7 is axially fixed to prevent the axial movements which would otherwise result from the forces created by meshing. This is achieved by the interposition of a ball race 11 in a seat 12 formed in the stator which arrangement allows the ring 7 rotary freedom.

From the preceding description it will be clear that the device provides a positive control arrangement for the blades 3 of the distributor which arrangement can be completely free from mechanical play and which therefore enables very fine angular adjustments of the blades 3 to be made.

The teeth of ring 7, and consequently of the wheels 6 and of the shaft 8, can be of any suitable profile but are advantageously helical to ensure continuity of meshing engagement.

Various modifications of the invention are of course possible within the scope of the appended claim.

What I claim is:

In a gas turbine having a stator body and impeller rotatably mounted therein and a row of radially arranged blades controlling the flow of pressure towards said impeller, means for varying the incidence of said blades comprising a cylindrical base extending from each blade towards the turbine axis through a seat formed in the stator body and having one end of reduced diameter, rollers within each of said seats for rotatably supporting therein the cylindrical bases of the blades, toothed wheels keyed to the ends of said reduced diameter of said bases, a ring gear coaxial with said impeller rotatably mounted in said stator body and radially arranged inside of said seats of said cylindrical bases of said blades and axially displaced with respect to said seats in a direction opposite said impeller, a set of radial teeth in said ring gear meshing with said toothed wheels keyed to the ends of said reduced diameter end of said bases, a set of inner teeth in said ring gear disposed at right angles to said set of radial teeth, a roller bearing arranged between the stator body and said ring gear, said bearing comprising a ball race and annular seats formed in said stator body and ring gear and inclined with respect to the ring axis in such a manner as to prevent axial displacements of the said ring away from said set of toothed wheels, a control shaft arranged parallel to the impeller axis and rotatably mounted in an axially extending seat formed in the stator body and having a toothed end meshing with the inner teeth of the said ring gear, and an actuating lever keyed to the other end of said control shaft projecting outwardly from said axially extending seat being further provided in order to turn said control shaft and thereby to vary the incidence of the blades of said stator.

References Cited

UNITED STATES PATENTS

| | | | |
|---|---|---|---|
| 1,497,723 | 6/1924 | Huguenin | 170—160.48 X |
| 2,460,778 | 2/1949 | Willgoos | 253—78 X |
| 2,862,687 | 12/1958 | Aguet et al. | 253—78 |
| 2,976,015 | 3/1961 | Gilbert | 253—78 |
| 3,013,771 | 12/1961 | Henny | 253—78 X |

FOREIGN PATENTS 726,772  10/1942  Germany.

EVERETTE A. POWELL, JR., *Primary Examiner.*